US012694010B2

(12) United States Patent
Bain et al.

(10) Patent No.: US 12,694,010 B2
(45) Date of Patent: Jul. 28, 2026

(54) MANAGING DATA AVAILABILITY BASED ON CHANGE DETECTION

(71) Applicant: Robinhood Markets, Inc., Menlo Park, CA (US)

(72) Inventors: Tamara Bain, Menlo Park, CA (US); Parth Upadhyay, Sunnyvale, CA (US); Nithin Tammishetti, Jersey City, NJ (US); Li Ma, Jersey City, NJ (US); Chenyu Yan, Mountain View, CA (US); Jing George, New York, NY (US); Taylor Mann, Silverthorne, CO (US)

(73) Assignee: Robinhood Markets, Inc., Menlo Park, CA (US)

( * ) Notice: Subject to any disclaimer, the term of this patent is extended or adjusted under 35 U.S.C. 154(b) by 0 days.

(21) Appl. No.: 18/660,001

(22) Filed: May 9, 2024

(65) Prior Publication Data

US 2025/0348382 A1 Nov. 13, 2025

(51) Int. Cl.
G06F 16/00 (2019.01)
G06F 16/23 (2019.01)
(52) U.S. Cl.
CPC ............................... G06F 16/2343 (2019.01)
(58) Field of Classification Search
CPC ............. G06F 11/1433; G06F 16/2343; G06F 2201/84
See application file for complete search history.

(56) References Cited

U.S. PATENT DOCUMENTS

| | | | | |
|---|---|---|---|---|
| 5,359,730 | A | * | 10/1994 | Marron .................. G06F 8/656 |
| | | | | 717/169 |
| 5,893,079 | A | | 4/1999 | Cwenar |
| 5,987,432 | A | | 11/1999 | Zusman et al. |
| 7,660,759 | B2 | | 2/2010 | Delta et al. |
| 7,783,549 | B1 | | 8/2010 | Benson et al. |
| 7,877,319 | B2 | | 1/2011 | Miles et al. |

(Continued)

FOREIGN PATENT DOCUMENTS

CN 114077518 A * 2/2022 .......... G06F 11/1448

OTHER PUBLICATIONS

International Search Report & Written Opinion, PCT Application No. PCT/US2025/028458, dated Jul. 28, 2025, 12 pgs.

(Continued)

*Primary Examiner* — Syed H Hasan
(74) *Attorney, Agent, or Firm* — Duane Morris LLP

(57) ABSTRACT

A system for managing data availability for database transactions is disclosed. The system is programmed to receive source data and extract a plurality of events from the source data. The system is programmed to create a halt record corresponding to each event of the plurality of events. The system is programmed to resolve conflicts among one or more halt records. The system is programmed to receive a request for a specific database transaction related to a specific database item from a client device. The system is programmed to determine whether any halt record is in effect for the specific database item. The system is programmed to perform the specific database transaction in response to determining no halt record is in effect. The system is programmed to transmit a result of the specific database transaction in response to the request to the client device.

20 Claims, 6 Drawing Sheets

(56) References Cited

U.S. PATENT DOCUMENTS

| 8,055,575 | B2 | 11/2011 | Grody et al. | |
| 8,489,495 | B2 | 7/2013 | Cicero | |
| 8,682,776 | B2 | 3/2014 | Feilbogen et al. | |
| 8,738,487 | B1 | 5/2014 | Schmidt et al. | |
| 11,823,265 | B2 | 11/2023 | Schmitt et al. | |
| 2003/0191741 | A1* | 10/2003 | Kurosawa | H04L 69/40 |
| 2005/0256797 | A1 | 11/2005 | Tyulyaev | |
| 2005/0267836 | A1* | 12/2005 | Crosthwaite | G06Q 30/0201 |
| | | | | 705/37 |
| 2009/0216674 | A1* | 8/2009 | Nunes | G06Q 40/04 |
| | | | | 705/37 |
| 2009/0300017 | A1 | 12/2009 | Tokusho et al. | |
| 2010/0281006 | A1* | 11/2010 | Scholtz | G06F 9/466 |
| | | | | 707/703 |
| 2016/0063622 | A1* | 3/2016 | Van Tol | G06Q 40/06 |
| | | | | 705/37 |
| 2018/0225239 | A1 | 8/2018 | Golla et al. | |

OTHER PUBLICATIONS

"Extended Trading—Overview, How It Works, Benefits and Risks", CFI Education Inc., 6 pages <https://corporatefinanceinstitute.com/resources/equities/extended-trading/> Accessed Aug. 29, 2024.

"Extended-hours trading", Robinhood, 5 pages <https://robinhood.com/us/en/support/articles/extendedhours-trading/> Accessed Aug. 29, 2024.

Salvucci, "What Is Extended-Hours StockTrading & Why Is It Important?", The Street, Dec. 2, 2022, 7 pages, <https://www.thestreet.com/dictionary/extended-hours-stock-trading> Accessed Aug. 29, 2024.

* cited by examiner

Figure 3:
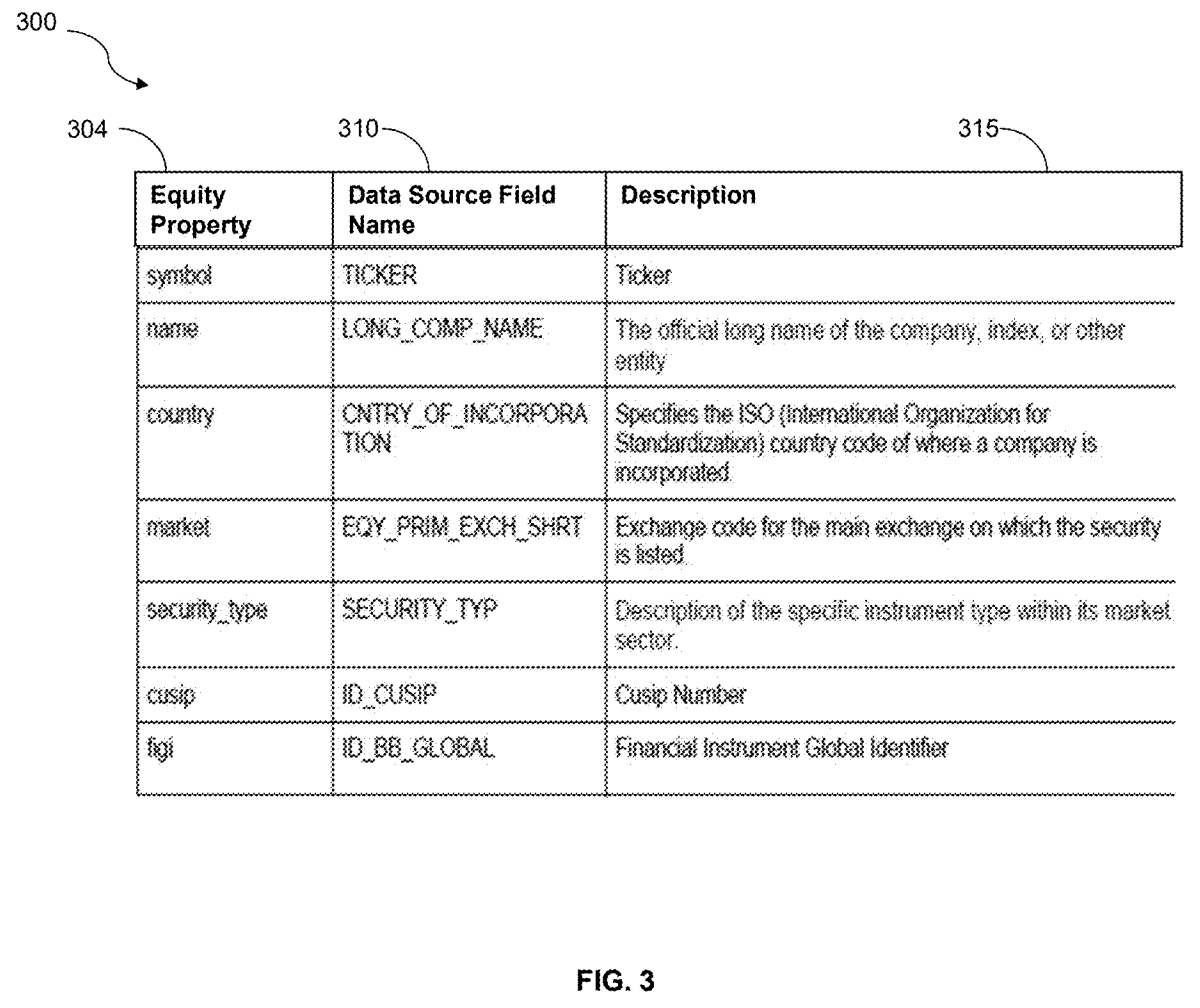

300

304

310

315

| Equity Property | Data Source Field Name | Description |
|---|---|---|
| symbol | TICKER | Ticker |
| name | LONG_COMP_NAME | The official long name of the company, index, or other entity |
| country | CNTRY_OF_INCORPORA TION | Specifies the ISO (International Organization for Standardization) country code of where a company is incorporated |
| market | EQY_PRIM_EXCH_SHRT | Exchange code for the main exchange on which the security is listed |
| security_type | SECURITY_TYP | Description of the specific instrument type within its market sector. |
| cusip | ID_CUSIP | Cusip Number |
| fgi | ID_BB_GLOBAL | Financial Instrument Global Identifier |

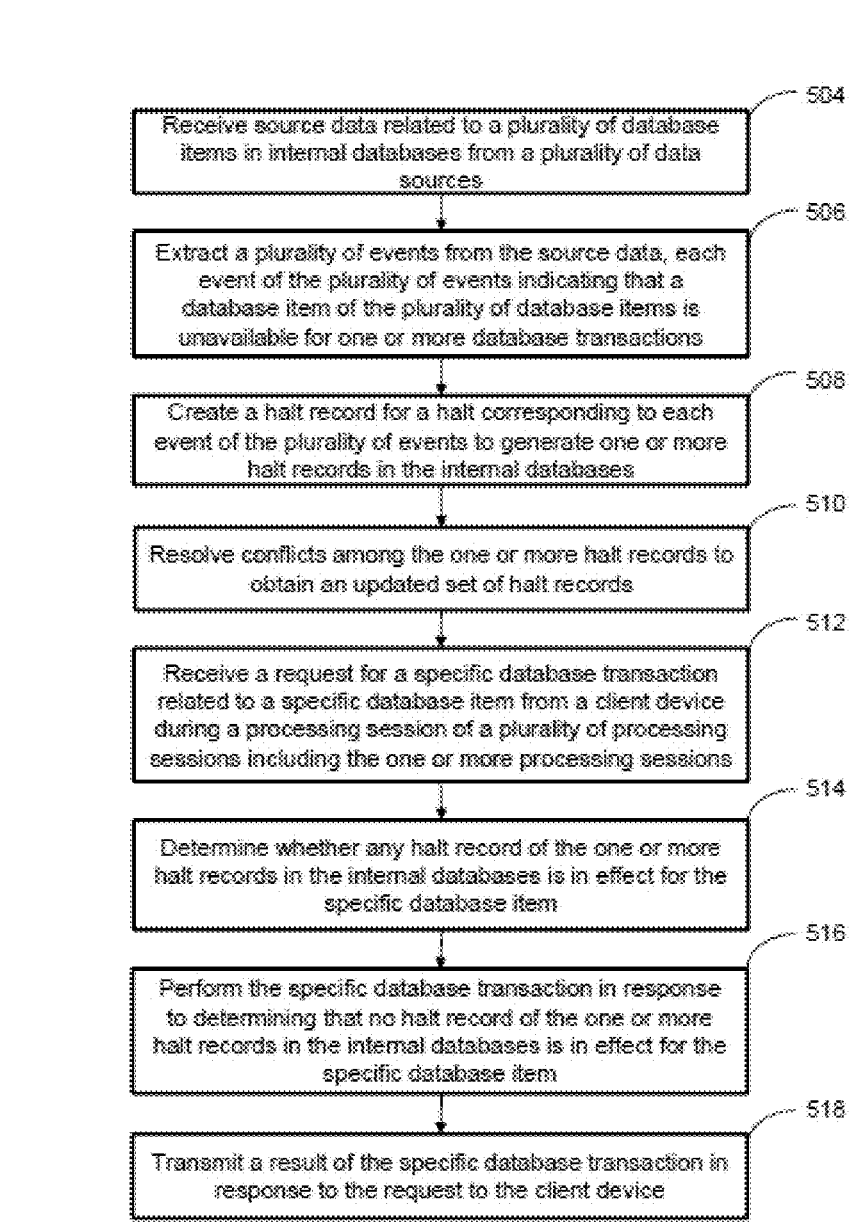

504

Receive source data related to a plurality of database items in internal databases from a plurality of data sources

506

Extract a plurality of events from the source data, each event of the plurality of events indicating that a database item of the plurality of database items is unavailable for one or more database transactions

508

Create a halt record for a halt corresponding to each event of the plurality of events to generate one or more halt records in the internal databases

510

Resolve conflicts among the one or more halt records to obtain an updated set of halt records

512

Receive a request for a specific database transaction related to a specific database item from a client device during a processing session of a plurality of processing sessions including the one or more processing sessions

514

Determine whether any halt record of the one or more halt records in the internal databases is in effect for the specific database item

516

Perform the specific database transaction in response to determining that no halt record of the one or more halt records in the internal databases is in effect for the specific database item

518

Transmit a result of the specific database transaction in response to the request to the client device

FIG. 5

MANAGING DATA AVAILABILITY BASED ON CHANGE DETECTION

TECHNICAL FIELD

The present disclosure relates to managing data availability and system service level, and more particularly to performing data processing activities through data and software updates.

BACKGROUND

Data processing activities requested by users of databases can be constrained to specific times or conditions. The constraints on data processing activities are typically enforced because of changing conditions of the data due to system operations, such as a change in data parameters or a total loss of data availability. Data change conditions are typically evaluated outside of processing sessions where requests for data processing activities can be submitted, and the data processing activities are performed based on the detected data change conditions. For example, when a data change condition is detected for a specific piece of data, the data can be updated with the correct parameter or availability before the processing session so that the data processing activities can be properly performed.

As an example, trading of instruments (e.g., securities, commodities, etc.) is performed during normal hours while the market is open (e.g., 9:30 a.m. to 4 p.m. Eastern time in the United States). The instruments and their availability can change for a variety of reasons, such as corporate actions or other instrument changes, such as a ticker name change or instrument delisting. Typically, these instrument changes are evaluated during the after-market hours and the available instruments are updated before the market opens the next day. There is a growing desire to allow instrument trading outside the normal hours (e.g., during extended hours that allows trading also between 4 a.m. and 9:30 a.m. and 4 p.m. and 8 p.m. or all-day hours that further allows trading between 8 p.m. to 4 a.m. on certain days). However, all day instrument trading is typically limited by the after-market instrument change evaluation and update process.

It would be helpful for a system to manage requests for data processing activities and perform these data processing activities properly and efficiently subject to the constraints on the data processing activities.

SUMMARY

The appended claims may serve as a summary of the invention.

BRIEF DESCRIPTION OF THE DRAWINGS

Example embodiments will now be described by way of non-limiting examples with reference to the accompanying drawings, in which:

FIG. 3. illustrates an exemplary instrument data conversion table in accordance with some embodiments;

FIG. 5 illustrates an example process performed by a computer application server in accordance with some embodiments.

DETAILED DESCRIPTION OF CERTAIN EMBODIMENTS

Figure 1:
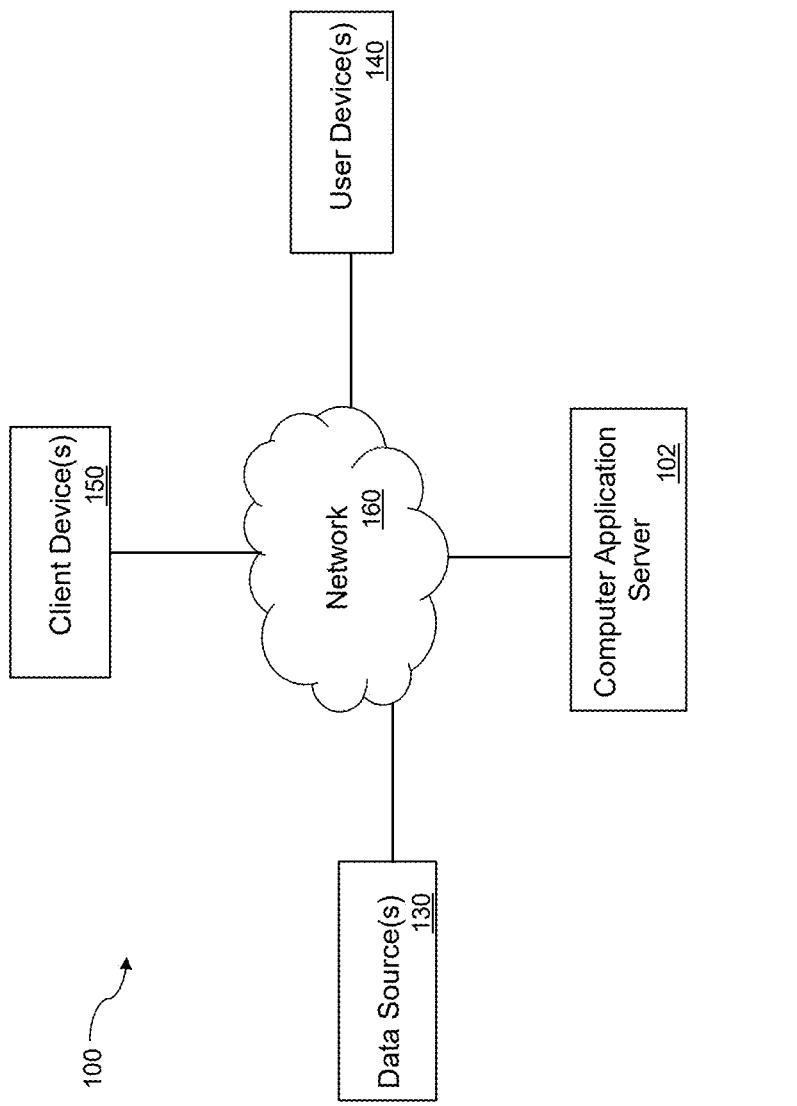
FIG. 1 illustrates an example networked computer system in which various embodiments may be practiced.

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s).

1. General Overview

Systems and methods for managing data availability for database transactions are disclosed. A system of the present disclosure can be programmed to receive source data from one or more data sources. The system can also be programmed to extract one or more events from the source data. The system can also be programmed to create one or more halt records for a halt for each event of the plurality of events. The system can also be programmed to resolve conflicts among the one or more halt records to obtain an updated set of halt records. The system can also be programmed to receive one or more requests for a specific database transaction on a specific database item from a client device. The system can also be programmed to determine whether the halt record is in effect for the specific database item. The system can also be programmed to perform the specific database transaction in response to determining that no halt record is in effect for the specific database item. The system can also be programmed to transmit a result of the specific database transaction in response to the one or more requests to the client device. In some embodiments, the one or more steps are performed by one or more processors.

In some embodiments, a computer application server ("server") is programmed to maintain its database of database items. The server is further programmed to receive source data from various data sources. These data sources can include outside vendors that prepare the source data or can be internally prepared source data. The source data provide indications of events that can cause changing data parameters for the database items, such as current or future corporate action events, symbology change events (e.g., instrument ticker name change), or instrument exchange delisting.

For example, the source data can indicate that stock "A" is about to undergo a split, which generally means that the split becomes effective in the stock market at some point (e.g., 8 p.m. Eastern Time on the current trading day or when the stock market opens the next day at 9:30 a.m. Eastern Time). Therefore, any trading request received before 8 p.m. would apply to the stock pre-split, while any trading request received at or after that time would need to be applied to the stock post-split. The server can be programmed to incorporate the split into its databases at some point during off-market hours, such as sometime between 8 p.m. on the current day and 9:30 a.m. the following day. The database change during the split will include one or more instrument changes, such as a change in price or a change in customer position (i.e., number of shares). During that time, a trading request generally cannot be completed in near real time, which means that when the trading request is subsequently processed, the state of the instrument for a customer could be different from when the trading request was received (e.g., at a different price, at a different customer position, etc.).

The server can be programmed to create one or more halt records for a halt on data processing activities for a database item that corresponds to the events extracted from the source data. The halt records are used to identify a status of the halt, the data source the halt record was generated from, a reason for the event, the processing session when the halt should take place, or an end time of the halt. For example, the server can then identify one or more pieces of data undergoing a change, such as an instrument undergoing a corporate action, a symbology change, or a delisting event. These data changes indicate that a data processing request should not be processed either at all or during a specific period of time, such as a processing session (e.g., an extended-hour session covering only between 4 a.m. and 9:30 a.m. and between 4 p.m. and 8 p.m. immediately outside the normal hours, or an all-day session covering only between 8 p.m. to 4 a.m. outside the normal hours and extended hours). The server can generate a halt, which will prevent data processing requests for the specific data undergoing a change from being processed until the halt has been lifted.

The server can be configured to receive one or more requests for a specific data processing activity on a specific database item from a client device, which leads to one or more database transactions. The server can then be configured to determine if a halt record is in effect for the specific database item, which may occur through a direct database call, communicated through an application programming interface (API), or some other suitable method. If there is no halt record in effect, the server can allow the specific data processing activity. The server can also be programmed to transmit a result of the specific data processing activity in response to the one or more requests to the client device that made the request.

The system and methods disclosed herein have several technical benefits. The system avoids a single point of failure by processing data from multiple data sources and resolves conflicts in a multi-source, multi-user environment to increase overall accuracy of the system. However, it will be appreciated that the system is also configured to be idempotent such that if the data from a data source is reprocessed, the resulting reprocessing generates the same halts. In addition, the system achieves high data availability and service level by taking measures to shorten periods when user requests for data transactions cannot be fulfilled. Also, despite daily server updates, the system offers no down time issues, facilitating all-day data processing capability.

As an example, the system receives and processes source data from one or more data sources so that data changes are detected. When data changes are detected, the system generates halts to prevent data processing requests for that specific database item from being processed, which protects both the firm (e.g., a trading platform) and a user (e.g., a trader). The halts generated by the system with specific halt periods also allow the server to perform as many data processing activities outside normal hours as possible by removing the halts when the data change is complete or no longer valid. The generated confirmation that the source data have been processed, and any necessary halts have been generated, advantageously allows the system to automatically start processing data processing requests not subject to a halt during the next processing session with the most updated data. If a halt is in effect, the system can advantageously store a data processing request subject to the halt and perform the data processing request when the halt has lifted, preventing a user from having to resubmit their data processing request.

2. Example Computing Environments

FIG. 1 is shown in simplified, schematic format for purposes of illustrating a clear example and other embodiments can include more, fewer, or different elements.

In some embodiments, the networked computer system 100 comprises a computer application server ("server") 102, one or more data sources 130, one or more user devices 140, and one or more client devices 150, which are communicatively coupled through direct physical connections or via a network 160.

In some embodiments, the one or more data sources 130, such as outside vendor systems, prepare and make available specific source data for data processing activities, such as instruments available to be traded. For example, the data sources 130 can include source data offered by database servers run by companies such as Bloomberg L.P., Nasdaq, Inc., Intercontinental Exchange, Inc., Depository Trust & Clearing Corporation, Blue Ocean Technologies, LLC, or other suitable databases, just to provide a few examples. The data sources 130 can be configured to communicate with the server 102 either through manual data pulls from the data sources 130 or through automatic data push through the network 160. Each of the data sources 130 can comprise any computing facility with sufficient computing power in data processing, data storage, and network communication for performing the above-mentioned functions.

In some embodiments, the server 102 hosts and executes various computer applications, such as backend applications configured to control when data stored locally are allowed to undergo specific database transactions, a data processing platform that supports such database transactions by ingesting database item updates and transmitting requests to an external system to complete data processing activities, or a web server that receives and responds to data processing requests from a corresponding web client. In some embodiments, the server 102 maintains one or more databases for managing data processing activities, which can lead to one or more database transactions. As an example, in addition to data representing instruments to be traded, the databases can include data that represent data processing requests from users or internal halt instructions for halting processing of such requests. The one or more databases of server 102 are internal databases that receive feeds from the one or more data sources 130 and store derived data. The server 102 can comprise any computing facility with sufficient computing power in data processing, data storage, and network communication for performing the above-mentioned functions.

In some embodiments, each of the one or more user devices 140 hosts and executes various computer applications, such as a web browser, within which a web application can be running. A user device of the one or more user devices 140 can be configured to communicate with the server 102 via an application of server 102, to facilitate managing data processing requests and halts, for example. The server 102 can be configured to notify a user device of one or more user devices 140 of failed or delayed data processing requests or of active halts according to some embodiments. The one or more user devices 140 can comprise a desktop computer, laptop computer, tablet computer, smartphone, or wearable device.

In some embodiments, each of the one or more client devices 150 hosts and executes various computer applications, such as a web browser, within which a web application can be running. The client devices 150 can be configured to communicate with the server 102 in automatically performing activities involving remote computer applications. A client device of the one or more client devices 150 can be configured to communicate with the server 102 via an application of server 102 to submit data processing requests and receive halt notifications, for example. The server 102 can be configured to notify a client device of the one or more client devices 150 of failed data processing requests or delayed data processing requests, and the reason for the failure or delay according to some embodiments. The one or more client devices 150 can comprise a desktop computer, laptop computer, tablet computer, smartphone, wearable device, or some other suitable device.

The network 160 can be implemented by any medium or mechanism that provides for the exchange of data between the various elements of FIG. 1. Examples of the network 160 include, without limitation, one or more of a cellular network, communicatively coupled with a data connection to the computing devices over a cellular antenna, a near-field communication (NFC) network, a Local Area Network (LAN), a Wide Area Network (WAN), or the Internet, a terrestrial or satellite link, just to provide a few non-limiting examples.

In some embodiments, the server 102 is programmed to manage a data processing platform and associated databases and receive requests from the client devices 150. The server 102 is also programmed to receive source data from the data sources 130. The server 102 can be further programmed to store the source data from the data sources 130 and convert the source data to a common file type with standardized terminology. The server 102 can be configured to determine which portions of the associated databases are not amenable to data processing based on the source data from the data sources 130 and implement halts for specific database items. The server 102 can be further programmed to notify a client device of the one or more client devices 150 that has submitted a request for a data processing activity being halted of these halts. The server 102 can be further programmed to lift the halts at a subsequent time when the database items are again amenable to data processing, to enable data processing activities to be carried out in response to the data processing requests.

Once halts are lifted, previously requested and newly requested data processing activities can be performed. In some embodiments, data processing requests submitted when a halt was active can be processed from a queue after the halt has been lifted. As an example, instrument trading requests that were previously queued can be processed once the halt is lifted.

3. Functional Descriptions

Figure 2:
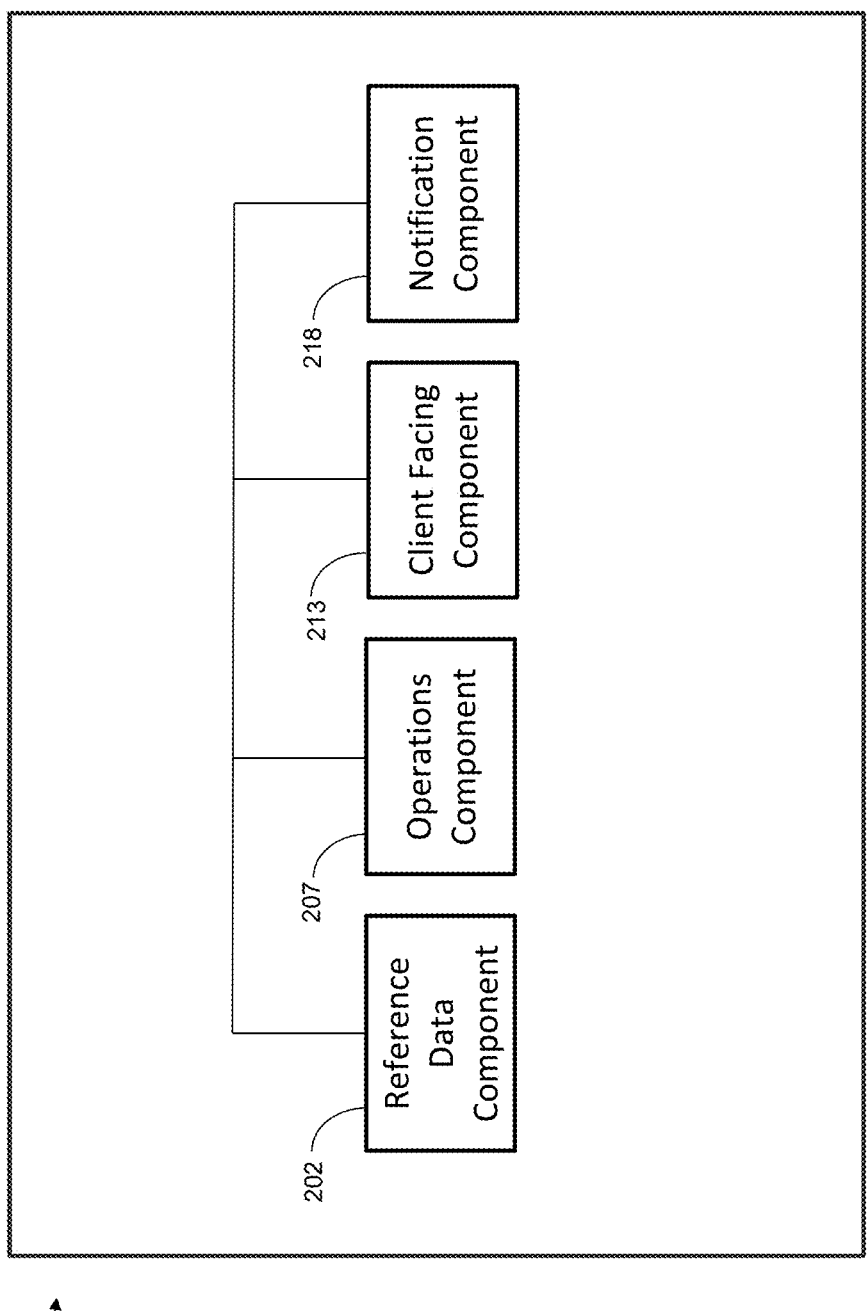
FIG. 2 illustrates example components of a computer application server in accordance with some embodiments.

In some embodiments, the server 102 can be programmed to perform specific functions, as discussed in various embodiments herein. These functions can be implemented as software components, general or special-purpose hardware components, firmware components, or any combination thereof. As illustrated in FIG. 2, the server 102 can include a reference data component 202, an operations component 207, a client facing component 213, and a notification component 218. FIG. 2 is shown in simplified, schematic format for purposes of illustrating a clear example and other embodiments can include more, fewer, or different elements connected in various manners. As an example, the server 102 can be programmed to permit data processing activities with one or more time constraints (e.g., in all-day hours, normal hours only, extended hours only, etc.). Data processing activities can lead to one or more database transactions. As an example, data processing activities can include looking up the number of instrument shares in a client account, trading some instrument shares (e.g., buying new shares or selling held shares), adding or withdrawing funds from a client account, etc. Most data processing activities are eligible for all-day and/or extended hour processing in addition to normal hours.

The reference data component 202 can determine changes to be applied to database items from one or more data files from one or more data sources 130, which can affect what database items are available for transaction. For example, source data from the one or more data sources 130 can include a plurality of database items. The source data can provide indications of one or more events that prohibit data processing activities. In response to the events, the reference data component 202 can generate a halt record for specific data processing activities when the database item is going through a change, such as an instrument undergoing a corporate action, a ticker name change, or an instrument delisting. The halt record can specify that the database item subject to the halt is not eligible for the all-day processing and is only eligible to be processed during extended hours and normal hours, or just during the normal hours.

In some embodiments, the reference data component 202 can receive the source data from the one or more data sources 130 prior to 8 p.m. Eastern time when a processing session starts at 8 p.m. Eastern time. In some embodiments, the reference data component 202 can receive the source data from the one or more data sources 130 prior to 4 a.m. Eastern Time when a processing session starts at 4 a.m. Eastern time before the normal hours begin.

Upon detecting that a specific database item is or will be going through a change in the internal databases, the reference data component 202 can generate a halt to prevent requests for data processing activities on the specific database item from being processed. The halt effectively marks the database item as "unable to be processed" for a predetermined period of time. In some embodiments, a transaction request for a database item that has been halted can be queued for processing once the halt has been lifted. For example, a trade request for an instrument that has been halted may be queued for processing when the halt is lifted. In some embodiments, the system can require confirmation from the customer that they want the trade to be placed after the halt has been lifted (e.g., at the beginning of regular trading hours, pre-market hours, etc.). In some embodiments, the halts are generated prior to the start of the next processing session, such as 8 p.m. Eastern time or 4 a.m. Once the database item is marked as "unable to be processed," a data processing activity can be prohibited during one or more processing sessions. In some embodiments, the all-day processing session begins at 8 p.m. Eastern time and the normal processing session begins at 9:30 a.m. Eastern time the following day. Typically, a database item in the internal databases will complete the change before the normal hours begins. However, it will be appreciated that a database item change can be completed at any time during the day. For example, the change can be completed at the end of the extended hours trading session for the current trading day (e.g., 8 p.m. Eastern Time) or at the end of the current trading day (e.g., 11:59 p.m. Eastern Time). In some embodiments, once the change is complete, the data can then be eligible for data processing activities again. In some embodiments, a retrospective reconciliation is completed after the normal transaction hours to ensure that any missed data changes are identified and reconciled. For example, the one or more data sources 130 may have missed an instrument going through a change, but the retrospective reconciliation process will identify the instruments that went through a change without a corresponding halt so that remedial action can occur (e.g., canceling a previous order, implementing a halt for future transactions, etc.).

The operations component 207 can manage different processing sessions, which can be defined by progressively longer session lengths. The operations component 207 can assign each database item to precisely one processing session corresponding to the maximum session length for the database item, and that processing session can be shared by all client accounts or can vary among client accounts. For example, a specific instrument may be traded only during normal hours for all client accounts. The operations component 207 can also perform database transactions arising from a request to perform data processing activities. For example, the operations component 207 can forward a trading request from a client device 150 to a select platform, such as a third-party electronic communication network, receive a trading result, and update the account data associated with the client device 150 through the database transactions.

During a processing session, the client facing component 213 can receive, from a client device of the client devices 150, requests for data processing activities based on the available database items for that processing session. For example, one or more halts can be applied to an all-day processing session for particular database items when it has been determined that the database items will be going through a change requiring a transaction to be halted. The halt can prevent a requested data processing activity from being performed or prevent a request for a data processing activity to be submitted in the first place. In some embodiments, a data processing request that has been received can be queued for execution until the halt is lifted, such as when a new processing session begins. In other embodiments, the data processing request is rejected without being placed in a queue.

In some embodiments, the notification component 218 can transmit a notification to the client device 150 or other components of the server 102 that the data processing activity cannot be performed during the processing session upon receiving the data processing request. In some embodiments, the notification component 218 can also provide notifications of database item parameters, such as a change in instrument price or trade availability, to the client device 150 or other components.

3.1. Ingesting and Evaluating Status Updates

In the embodiments discussed herein, a user interface of a data processing platform, which can encompass one or more of the operations component 207, client facing component 213, or notification component 218, is provided as a smartphone application and/or a web application. The web application can be associated with a set of web addresses or uniform resource locators (URLs) to which a user can navigate. To determine what data processing activities can be performed, source data from the one or more data sources 130 are ingested at a plurality of times throughout the day. The source data is evaluated through the reference data component 202 to determine if a specific database item is eligible to be processed. For example, the source data can indicate that one or more instruments are undergoing a corporate action, such as a stock split (forward or reverse), a spinoff, a merger, a security type change, a liquidation, a bankruptcy, or some other change such as a ticker name change or a change in listing eligibility to provide a few examples.

As mentioned above, database item changes are typically evaluated for outside of a time constraint, such as between the end of one instrument trading day (T) and the beginning of one instrument trading day (T+1). However, when providing extended hours or all-day data processing availability, there is a risk that a data processing request involving a specific database item comes in when the data is outdated or unstable and therefore fulfilling the data processing request can lead to data errors. For example, a particular instrument undergoes a corporate action between the end of one trading day (T) and the beginning of the next trading day (T+1). Corporate actions, in particular, are timely incorporated into the internal databases of the server 102 to avoid bad or ineligible instrument trades by client accounts, such as trading an instrument with the wrong price. Because of this, it is helpful to receive source data from the one or more data sources 130 that indicate corporate actions or other causes of data changes as early as possible in the day so that the data changes can be evaluated as early as possible, facilitating the ability to provide an all-day processing session and extended hours processing session.

In some embodiments, the source data can be pulled from an outside vendor's website or requested directly from the vendor at a particular time. In some embodiments, the source data can be pushed directly from the outside vendor and ingested by server 102. The source data from the one or more data sources 130 can have different data, different terminology, and even a different file format. As such, once the source data from the data sources 130 has been ingested, the server 102 provides an application to transform the data to a common, standardized file for use by the server 102 and/or user devices 140 to determine if the data is undergoing a change. For example, the source data from the data sources 130 can indicate that an instrument is undergoing a corporate action or some other change such as a ticker name change or a change in listing eligibility.

FIG. 3 illustrates an exemplary instrument data conversion table 300 in accordance with some embodiments. As illustrated in FIG. 3, the server 102 can be programmed to use a conversion table 300 to transform the instrument source data from data sources 130 to a common file type and format. The conversion table 300 can include an internal equity property 304 that correlates to an outside data source field name 310. In some embodiments, the table 300 can include a description 315 for a user to easily discern what the data terminology means.

After transformation of the data, the server 102 can be programmed to automatically determine that an instrument is undergoing a corporate action or some other change, such as a ticker name change or a change in listing eligibility. As an example, instrument ticker information in the internal databases and a reference number, such as the Committee on Uniform Securities Identification Procedures (CUSIP) number or the Financial Instrument Global Identifier®, can be used to detect instrument ticker changes by comparing the reference number to the current and previous instrument ticker information. As another example, instrument delistings can be detected by comparing the current and previous market or exchange code to determine if the exchange the instrument is traded on has changed or been removed from the exchange entirely. In some embodiments, the source data from one of the data sources 130 explicitly calls out a database item change, such as a corporate action or some other change, such as a ticker name change or a change in listing eligibility.

In some embodiments, the server 102 can be programmed to provide the transformed source data from the data sources 130 to one of the user devices 140 for determining if a database item is undergoing a change. As an example, the transformed or further updated source data can indicate that a particular database item to be transacted is undergoing a change and flag the particular database item for further review. The flagging can be performed automatically by the server 102 after evaluation of the source data from the one or more data sources 130 or based on changes received from one of the user devices 140. In some embodiments, source data from one data source can be compared with the source data from a second or more data sources 130 to ensure the data is correct for each of the database items and minimize the risk of missing a change requiring a halt that one of the other data sources 130 did not indicate.

3.2. Implementing Data Processing Halts

If a particular database item to be processed is flagged as undergoing a change requiring a halt, the server 102, through the reference data component 202, is programmed to automatically implement a halt, preventing the database item from being processed. For each database item, such as an instrument, one or more events (e.g., corporate action, ticker name change, instrument delisting) can be detected from the source data of the same or different data sources of the data sources 130. When an event occurs, a halt can be implemented each time a database item change is detected or according to other aggregation or filtering criteria. In some embodiments, a halt can include changing the status of particular data in the internal databases to "halted," or some other similar terminology. In other embodiments, a halt can be implemented by placing a data processing request involving the particular database item in a queue, instead of processing the data processing request immediately. Alternatively, a halt can be implemented by creating a halt record for the specific data, such as an entry corresponding to the code below. Such a halt record can be linked with any number of requests for data processing activities. However, in some embodiments, the server 102 can be configured to transmit the halts to one or more of the user devices 140, such as through a messaging or collaboration tool, for manual evaluation and manual halt approval.

As an example using instrument trading, the code for creating a halt record can include:

```
create_internal_halt(instrument=
example_v2, #EquityV2
halt_details={"reason":            HaltReason.
    TICKER_CHANGE/HaltReason.
    SECURITY_TYPE_CHANGE/HaltReason.DEL-
    ISTING_OTC/HaltReason.DELISTING_COM-
    PLETE,
"details": "example reasons for halt",
"start_time": "2024 Feb. 1 20:00:00",
"end_time": "2024 Feb. 2 04:00:00",
"sessions": [Session.ALL_DAY],
"source": HaltSource.example datasource.get_name( ),
}
)
```

In some embodiments, such automatic halts are approved based on the source data from some data sources 130 that are more reliable and/or more inclusive, and halts generated from less reliable and/or less inclusive data sources 130 are forwarded to one or more of the user devices 140 for further evaluation and manual approval if necessary. For example, a more reliable data source can include source data from a company with a higher reputation score. A more inclusive data source 130 can include source data that includes more database items corresponding to the database items in the internal databases (e.g., data entries in the internal databases correspond to more data entries in the source data from the data source 130 compared to source data from other data sources 130). Conversely, a less reliable data source 130 can include source data from a smaller or less reputable company. A less inclusive data source 130 can include less database items corresponding to the database items in the internal databases (e.g., data entries in the internal databases correspond to less data entries in the source data from the data source 130 compared to source data from other data sources 130).

The halt records can define a specific reason for the halt, such as the type of database item change. For example, the halt can define the type of corporate action associated with an instrument or some other change, such as a ticker name change or a change in listing eligibility. The halt record can also define a specific time constraint that the halt is valid for, such as a specific processing session (e.g., normal, extended-hours, or all-day processing sessions). As an example, a halt record can specify, as part of the details, that an instrument subject to the halt is not eligible for all-day trading and is only eligible to be traded during extended hours and normal hours, or just during the normal hours, which can trigger the notification component 218 to send a notification to a client device through the client facing component 213 of such an effect or a rejection/failure of data processing requests during extended hours. The halt record can also define a specific start and stop time the halt is valid for. The start and end times could coincide with the start and end time of specific processing sessions or could be adjusted separately. Any component that refers to a halt record could use the session time constraints or the specific start and end times to determine whether the halt is in effect.

The specific start and end halt times are especially advantageous for extended hours and all-day data processing sessions, because it allows a halt to be generated at any time during the day for future execution. For example, a halt record generated during the normal hours can specify that the halt should be valid for extended hours or all-day processing sessions. It will be appreciated that the halt record can specify a time period that does not coincide with a specific processing session. For example, a halt may be generated to start at 8 p.m. of the current day (T) and end at 12 a.m. the next day (T+1). In some embodiments, the source of the halt is also defined in the halt record, such as one of the specific data sources 130. In some embodiments, the halt is ended or "lifted" when the next normal hours begins because the data has been updated with the correct information (e.g., instrument ticker name change, instrument split price, etc.) and the data processing activity can be performed again.

In some embodiments, the reasons for a halt can determine how the halt is generated. Halt durations can depend on a plurality of factors, some of which can provide for smaller halt durations that allow the halt to last through fewer processing sessions or be lifted during a processing session. As an example, unlike a corporate action, a symbology change does not entail certain calculations for client accounts and thus it could take less time to reflect such events in the internal databases. As an example, in the event of a forward split that is announced several weeks in advance, the internal databases for that specific instrument can be prepared and updated ahead of time so that the time needed to halt trade requests for this instrument can be reduced. In addition, some reasons for a halt predict a heavy volume of requests for data processing activities based on historical data, in which case reducing the halt time can be especially beneficial. Therefore, halts can be generated to avoid specific later processing sessions so as to allow data processing activities as early as possible without having to wait for the normal processing session to open. For example, for a forward split, typically more trading requests are expected during the extended hours right before the market opens with the new price. Therefore, the server 102 can be programmed to create a halt that is in effect only through the all-day hours outside the extended hours to allow the increased trading requests to be processed without delay.

In some embodiments, the data sources 130 that supply the source data can also determine when a halt can be lifted. For example, when source data is received from a reliable data source early, handling the events derived from the source data and updating the internal databases could begin and finish as early as possible without waiting for corroboration by another data source or suffering other delays. The earlier the source data is received, the earlier the internal databases can be updated and the shorter the halt duration. In addition, some data sources 130 serve as electronic communication networks, and the source data they provide are treated differently. When such a data source 130 acts as a single point of failure for data processing activities, that affects how the halt is implemented. For example, the platform managed by Blue Ocean Technologies, LLC can provide source data and also be the only system available to handle trading requests during the all-day hours (outside the normal and extended hours). When this platform indicates that an instrument is undergoing a change, it generally means that the platform is not trading this instrument until the next normal hours, and thus instrument could not be traded at all during the all-day hours. Therefore, a halt would be created for halting the processing of trading requests during the all-day hours, but not during the extended hours when another platform would be available.

It will be appreciated that halts can be generated based on a plurality of events and the duration of the halts can depend on a plurality of factors. The discussion herein is meant to merely provide a few non-limiting examples for understanding.

3.3. Halt Conflict Resolution

In some embodiments, halt conflicts for the same database item can occur when a new halt is created while an existing halt is pending or approved. Since the database item is either not yet updated and thus related database transactions should be halted, or otherwise, the server 102 is programmed to determine a single halt record for controlling data processing activities on the database item, as discussed below. The determination can occur as soon as each new halt is created or according to another schedule. The types of conflicts can include: (1) processing sessions; (2) status of the halt (i.e., approved, pending, etc.); (3) reasons for the halt; (4) the halt data source; and (5) the timing of the halt. Multiple types of conflicts can be present simultaneously, and the server 102 can be configured to process them in a predetermined order.

The processing session conflict can arise when there are two halts for different processing sessions (e.g., normal, extended-hours, or all-day processing sessions). For example, the server 102 might have been programmed to determine initially that a halt for a database item is for the all-day processing session but determine later that the halt should be for the extended-hours and all-day processing sessions. To resolve a session conflict, the resulting processing session can be merged and the resulting halt period can be adjusted according to specific rules. For example, the merging can be made to take the earliest start time and the latest end time to form a continuous period. In certain embodiments, the different processing sessions are associated with different data sources, leading to two types of conflicts occurring simultaneously. In this case, the server 102 can be programmed to resolve the data source conflict first, or to take the same approach described above to maximize the halt period for the halt reasons to be addressed and minimize the chance of mistakes.

A status conflict can arise when there are halts with different statuses (e.g., pending or approved). For example, a data source 130 might contain duplicate records indicating the same corporate action or some other change, such as a ticker name change or instrument delisting, each leading to the creation of a corresponding halt. The resolution to the status conflict can depend on the processing session the halts are flagged for. For example, when the sessions are the same, the status of the new halt will become approved when the status of any other halt is approved for the processing session, effectively merging the halts together. When the processing sessions are not the same, then the new halt will wait to become approved when the status of another halt for another processing session is approved, at which point the conflict can be resolved, as discussed in the previous paragraph.

A reason conflict can arise when there are multiple reasons for a halt (e.g., a merger and a ticker name change). For example, an instrument may be undergoing multiple corporate actions, as indicated in the source data of the data sources 130, each leading to the creation of a corresponding halt. To resolve a reason conflict, a priority or hierarchy can be established for the reasons of the halt. For example, a reason priority can be established that defines that the halt should be established for: (1) a corporate action related change; (2) a ticker name change; (3) a security change; (4) a delisting is complete; (5) a delisting to Over-the-Counter (OTC) status is in progress, in descending order. It will be appreciated that these reasons, data sources 130, and the order of priority are merely examples. Other reasons and order of priority are possible. Alternatively, the reasons could simply be combined together. The chosen reason matters to the extent of providing clarification to a client account and internal documentation.

A source conflict can arise when halts are generated based on source data from different data sources. As an example, source data from one of the data sources 130 can indicate that a change is occurring for a specific database item and source data from another one of the data sources 130 can indicate the same or a different change is occurring. To resolve a source conflict, a priority or hierarchy can be established for the sources. For example, a source priority can be established that defines that the halt should be established for: (1) internal instrument data analysis; (2) most reliable/most inclusive data source 130; and (3) less reliable/least inclusive data sources 130, in descending order. In some embodiments, the data sources 130 are retroactively analyzed and scored based on the accuracy of the data computed from precision and recall or other performance metrics. The most reliable data sources 130 having a higher score than the less reliable data sources 130. It will be appreciated that the data sources 130 and order of priority are merely examples. Other data sources and order of priority are possible. For example, the order of priority may change as one or more data sources 130 are added or removed.

A time conflict can arise when a halt is lifted mid-session. As an example, when a halt is set to lift mid-session, the end time of the halt is changed to a desired time during the middle of a session. If a new halt for the same instrument is generated from one of the data sources 130, the end time of the new halt may be set to some default end time, such as the beginning of the regular processing session. A time conflict may be resolved by setting the time range of the halt (i.e., start time and end time) to the shortest time range or longest time range for all associated halt timestamps. In some embodiments, the time conflict resolution may be resolved differently based on the type of change the instrument is going through. For example, data in a related database that depends on a certain type of database item in the internal database can be scheduled to be updated at a certain time, placing a constraint on when the change to this type of database item needs to be implemented. Using instrument trading as an example, during a forward split, customer positions (e.g., number of shares) may be scheduled to be updated at a certain time, which can place a constraint on when the instrument can be traded. Once the customer shares have been updated corresponding to the split, the halt may be lifted and the instrument is made available for trading again in near real time.

When a priority list is consulted to resolve a conflict, several different outcomes can occur. For example, when an approved halt already exists, a new halt of a lower priority can be rejected. When a pending halt already exists, a new halt from a higher priority can eventually receive a status of approved or pending depending on the source of the halt, to replace the pending, lower-priority halt. When a pending halt already exists, but a new halt is flagged from a lower priority, the new halt can be rejected unless it comes from an auto approved source.

When the reason for the halt no longer applies (i.e., has been resolved) or when the predetermined time period for a halt terminates, the halt can be lifted. For example, a halt can be automatically lifted by the server 102 or based on an instruction received from one of the user devices 140. In some embodiments, the server 102 is programmed to create a separate lift record, which can be linked to one or more halt records, instead of simply deleting those halt records in implementing a lift. Thus, halt lifts can also include specific data entries that are queued based on the time of the halt lift. For example, when a halt is created, a corresponding halt lift can be created for a specific time, such as the beginning of normal hours. Once normal hours begin and the halt lift becomes effective, the corresponding halt can be removed such that the database item subject to the halt is available to be processed again.

3.4. Initiating Processing Sessions

In some embodiments, the server 102 is programmed to signal the halt status in a variety of ways, such as: (1) by creating a special record (e.g., a KAFKA event) indicating that the most recent updates including halts are available in the internal databases; (2) by making a special snapshot file of the internal databases available outside a normal schedule; or (3) any combination thereof. The special record and snapshot file, alone or in combination, provide a redundancy of "start of session" confirmation for certain components of the server 102, such as the operations component 207, that the halts that need to be in effect during a halt period have been processed in the internal databases before the halt period, such as a particular processing session. The special snapshot file in particular includes those halts or halt records that can be referenced to determine whether data processing activities can be performed on specific database items at a subsequent time.

In some embodiments, the server 102 is programmed to generate or deliver the "start of session" confirmation automatically or based on an instruction received from one of the user devices 140. For example, the "start of session" confirmation can be automatically published as a result of an automated workflow established for the specific processing session. However, in some embodiments, a manual "start of session" confirmation can be needed if there is an abnormal situation or error status. As an example, an error condition can include the number of halts generated above a predetermined threshold. A large number of halts, based on an average number of instruments undergoing changes on a given day, can indicate that the data from the data sources 130 can be incorrect or corrupted. A large number of halts can also indicate erroneous logic in the reference data component 202.

Figure 4:
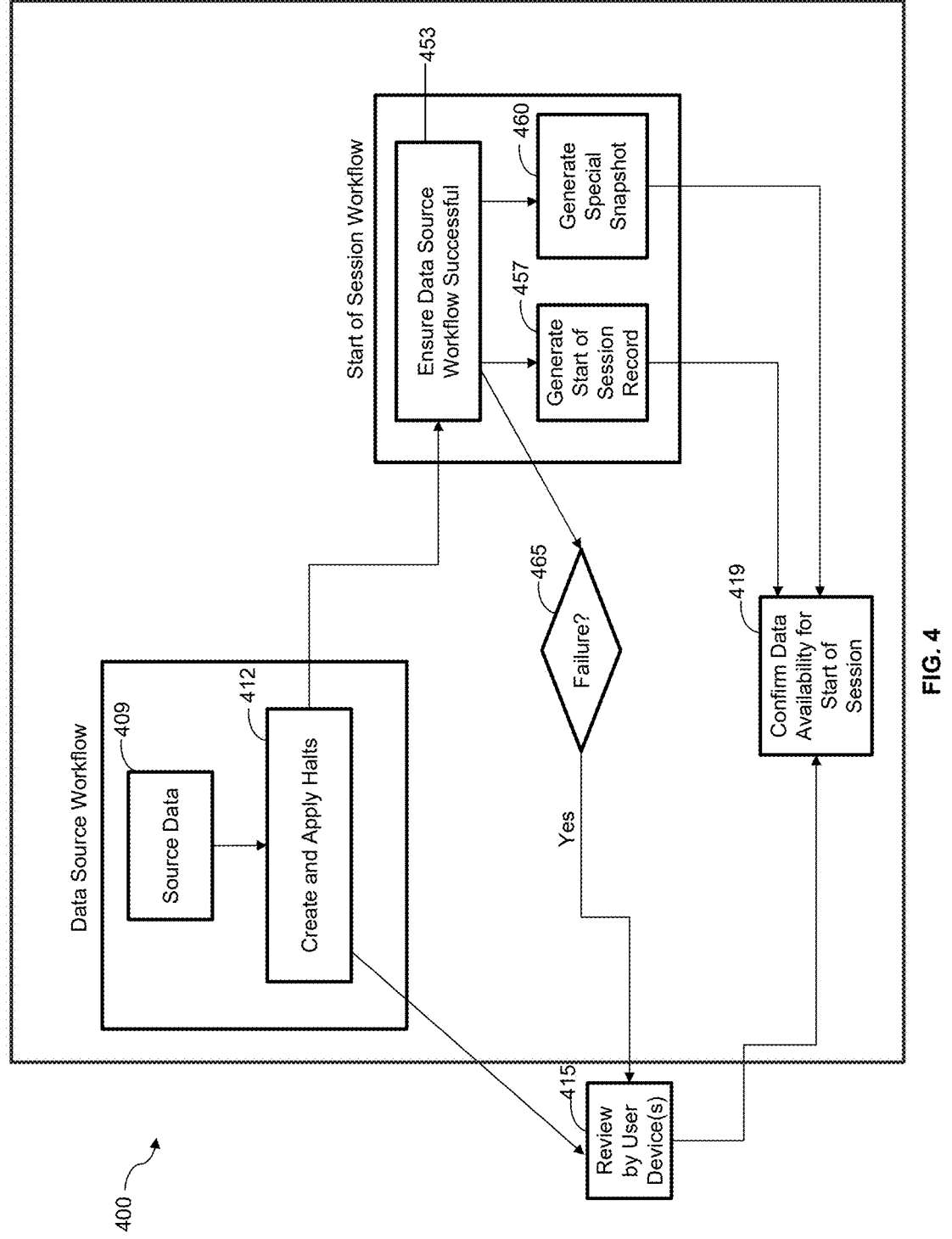
FIG. 4 illustrates an example process to publish a "start of session" confirmation in accordance with some embodiments.

Workflows can be used to process the data files ingested from the one or more data sources 130. FIG. 4 illustrates an example process 400 to publish a "start of session" confirmation in accordance with some embodiments. As illustrated in FIG. 4, one or more data source workflows can be established to process the source data at step 409 from one of the data sources 130. The data source workflows can also be used to create and apply halts at step 412 based on detected changes to the data, such as an instrument undergoing a corporate action or some other change. In some embodiments, after the data source workflow is completed with the creation of the halts, they are transmitted to one of the user devices 140 or another output device for review at step 415. Once the halts have been placed, a start of session command can be transmitted at step 419 from the user device to the server 102.

In some embodiments, a "start of session" workflow can be configured to automatically ensure that the one or more data source workflows are successful at step 453. When the data source workflows are successful, the "start of session" workflow will automatically lead to publishing the special record at step 457 and generating the special snapshot file for download at step 460. A "start of session" command can be transmitted to server 102 at step 419.

In some embodiments, the "start of session" workflow can be configured to determine if a failure has occurred at step 465. When a failure occurs, the "start of session" workflow can be configured to take automatic remediation steps or alert one of the user devices 140 that one or more data source workflows fail or there is some other error condition, such as that the number of halts exceeds a pre-determined threshold. As an example, a large number of halts can indicate an error condition with the source data from one of the data sources 130. A remediation to an error condition can include restarting communication with the data source 130 and "start of session" workflows to confirm the error. Another remediation to an error condition can include rejecting the source data from the data source 130 creating the error condition. After the error condition is resolved, the "start of session" command can be transmitted from a user device 140 to server 102 in step 419. It will be appreciated by those of ordinary skill in the art that other steps can be added or removed depending on the goal of the workflows, such as specific changes for the processing sessions the workflow is configured for.

In some embodiments, having processed the source data from the data sources 130, determined any changes, and generated any halts, the server 102 can be programmed to publish a special record that the update process is complete, through a KAFKA event, for example. Such a special record can be published in the same way as the halts are published, such as through the same KAFKA queue. By virtue of that feature, when the special record is consumed, all the halts covered by the special record would have also been consumed, ensuring proper access to those halts. Having a queue is especially useful to maintain an ordering of events, as "First In, First Out." The special record is also useful to guarantee the halts have been delivered to any downstream applications and can also indicate any mid-session halts that have been added. Such special records can be treated by the operations component 207 as notices that all necessary halts have been successfully generated. They provide a data synchronization checkpoint. As an example, in an all-day instrument trading environment, the server 102 can be programmed to process the source data from the data sources 130, determine and generate any halts, and publish the special record indicating that all the halts that should be in effect during a period starting at 8 p.m. Eastern time is complete prior to 8 p.m. Eastern time. The hosted trading platform may use this special record as a "start of session" confirmation as an indication that the reference data component 202 has evaluated the source data before the trading session and placed appropriate halts in response to the events derived from the source data.

In some embodiments, having processed the source data from the data sources 130, determined any database item changes, and generated any halts, the server 102, through the reference data component 202, is programmed to generate a special, unscheduled snapshot file of all database items and all the halt records that have been created. This special snapshot file is similarly treated by the operations component 207 as notices that all necessary halts that should be in effect in a particular processing session have been completed prior to the processing session.

Use of both the special record and the special snapshot file to establish the "start of session" confirmation provides redundancy in the event that either fails. Meaning that when the special record fails to publish, the special snapshot file alone can establish the "start of session" confirmation. Conversely, if the server 102 fails to make the special snapshot file available, the special record alone can establish the "start of session" confirmation.

The "start of session" confirmation communicates that no more halts are expected before the start of the next processing session. Failure to issue the "start of session" confirmation, meaning failure to generate both a special record and a special snapshot file, can indicate that not all the relevant halts have been placed. In that case, the server 102 can be programmed to presume halts for all the database items for which halts have not been placed to be on the safe side, until the failure is remedied. In some embodiments, the "start of session" confirmation can be published before each of the trading sessions. Although there is only one "start of session" confirmation per trading session, it can be overwritten in the event of additional data changes so that the associated halts can be updated with the most recent information. It will be appreciated that the failure to issue the "start of session" confirmation can also indicate that there is an issue with publishing the special record or special snapshot file even though all of the relevant halts have been placed.

3.5. Ensuring No Down Time

In some embodiments, the server 102 is updated every day, which includes redeploying the latest version of the hosted applications every day. In some embodiments, the server 102 can deploy a separate application or application programming interface (API) during extended and all-day processing sessions. In order to prevent downtime anytime including the all-day hours, the server 102 can use a rolling update strategy. For example, the updates can employ one or more KUBERNETES deployments with pods. The deployment using pods ensures that only a certain number of pods are down while they are being updated, and only a certain number of pods are created above the desired number of pods. In some embodiments, the number of pods that can be created above the desired number of pods during an update is 10% or more. In some embodiments, the number of pods that can be unavailable during the update process is 10% or more.

To make the deployments more robust, the number of pods created can be set to one giving time for pods to get healthy and then one of the old pods will be terminated before moving on to the rest of the pods. Another option to make the deployment more robust is to change the number of pods unavailable during the update process to zero. For example, each pod can be added to the internet protocol table for load balancing once the readiness probe succeeded. This ensures that the old pods are not terminated until the new pods are up and healthy. A third option to make the deployment more robust is to slow down the rollout process by having the process wait a pre-determined number of seconds after a pod is ready before continuing with the rollout. In some embodiments, the pre-determined time can be three seconds or more. As yet another example to make the deployment more robust, the minimum and maximum replicas can be increased. In some embodiments, the minimum pod replicas can be four and the maximum pod replicas can be sixteen. However, it will be appreciated that the minimum and maximum replicas can be automatically scaled based on traffic.

The pod availability in its terminating state can also be adjusted to ensure a data processing request, such as a new instrument trading request, can be processed immediately without interruption before termination of the pod. The grace period before termination of the pod can be thirty seconds, but can be adjusted up to two minutes or more. During this time, the pod will still be able to gather the result and transmit the result to one of the client devices 150, but new data processing requests will not be processed by the pod. In some embodiments, a preStop lifecycle hook can be used to extend the time before the final termination signal is sent to the container about to be terminated. For example, the lifecycle can be up to two minutes or more. Readiness probes can also be used to know when a container is ready to start accepting traffic. Similarly, liveness probes can be used to know when to restart a container at runtime, that way when a pod is unresponsive in runtime, it can automatically be restarted before it crashes. The aforementioned modifications to the KUBERNETES are used to provide a few examples. A person of ordinary skill in the art will appreciate that other modifications can be made to make the deployment process more robust.

In some embodiments, the server 102 can use a canary deployment strategy during a server and/or an application update. For example, server 102 through the operations component 207 can be programmed to route incoming processing requests between the older version and the new version of a hosted application. In some embodiments, the server 102 is programed to route 5% of the data processing requests to the new version. In some embodiments, the percentage of data processing requests routed to the new version is increased proportionally as the update is occurring. For example, when the update is 75% complete, 75% of the data processing requests are routed to the new version.

4. Example Processes

FIG. 5 illustrates an example process 500 performed by a computer application server in accordance with some embodiments. For example, the process 500 can manage data processing activities in accordance with some embodiments. FIGS. 4 and 5 are shown in simplified, schematic format for purposes of illustrating a clear example and other embodiments can include more, fewer, or different elements connected in various manners. FIGS. 4 and 5 are each intended to disclose an algorithm, plan, or outline that can be used to implement one or more computer programs or other software elements, which when executed, cause the performance of functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In certain embodiments, in step 504, the server 102 is programmed to receive source data related to a plurality of database items in internal databases from a plurality of data sources 130.

In step 506, the server 102 is programmed to extract a plurality of events from the source data, each event of the plurality of events indicating that a database item of the plurality of database items is unavailable for one or more database transactions.

In certain embodiments, the extracting includes at least one of comparing source data to a reference number, comparing source data from different data sources 130, and evaluating the source data from the data source 130.

In step 508, the server 102 is programmed to create a halt record for a halt corresponding to each event of the plurality of events to generate one or more halt records in the internal databases.

In certain embodiments, creating a halt record includes determining a time period that a database item from the plurality of database items is unavailable for database transactions, the time period including a start time and the end time of the halt. In certain embodiments, the end time is updated to be different from an end time of a session of the one or more processing sessions.

In certain embodiments, the halt record includes a status, a data source of the plurality of data sources 130 from which the event was extracted, a reason for the halt based on the event, one or more processing sessions in which the halt is in effect, and an end time of the halt. In certain embodiments, creating a halt record includes identifying the one or more processing sessions based on the reason or the data source 130.

In certain embodiments, when the reason predicts a volume of data processing activities above a certain threshold during a specific processing session of the plurality of processing sessions, the one or more processing sessions apply before the specific processing session.

In certain embodiments, the process 500 can include updating the plurality of database items based on the plurality of events before the end time of any halt record of the one or more halt records.

In certain embodiments, the process 500 can include transmitting a message to a queue for each halt record of a set of halt records that are to be in effect during a common processing session and subsequently transmitting a confirmation message to the queue before a start time of the common processing session indicating that the set of halt records have been created.

In step 510, the server 102 is programmed to resolve conflicts among the one or more halt records to obtain an updated set of halt records.

In certain embodiments, the conflicts among the one or more halt records include at least one of a processing session conflict, a status conflict, a reason conflict, a data source conflict, and a time conflict. In certain embodiments, when two halt records of the one or more halt records have multiple conflicts, resolving data source conflicts and processing session conflicts take precedence over resolving status conflicts, reason conflicts, and time conflicts.

In certain embodiments, resolution of conflicts is based at least in part on a hierarchy of the plurality of data sources 130 organized by reliability according to historical data or inclusivity relative to the internal databases.

In certain embodiments, the resolving includes, when two halt records for a common database item indicate two different processing sessions, merging the two halt records into one halt record with a new start time being the earlier start time of two different processing sessions and a new end time being the later end time of the two processing sessions, so that the halt is to be in effect continuously between the new start time and the new end time.

In certain embodiments, when the data source 130 is a single point of failure for a specific processing session of the plurality of processing sessions, the one or more processing sessions includes the specific processing session.

In certain embodiments, the process 500 can include publishing a special record and a special snapshot file after the resolving.

In certain embodiments, the process 500 can include creating an unscheduled snapshot file of the internal databases including the set of halt records in addition to scheduled snapshot files of the internal databases.

In step 512, the server 102 is programmed to receive a request for a specific database transaction related to a specific database item from a client device 150 during a processing session of a plurality of processing sessions including the one or more processing sessions.

In certain embodiments, the plurality of processing sessions respectively apply to non-identical periods within a day.

In certain embodiments, the specific database transaction requiring a read access to the database item. In certain embodiments, the request leads to updating account data associated with the client device 150.

In certain embodiments, the process 500 can include routing the request for the specific database transaction to a new version of a hosted application that is running concurrently with an old version of the hosted application during a rolling update.

In step 514, the server 102 is programmed to determine whether any halt record of the one or more halt records in the internal databases is in effect for the specific database item.

In certain embodiments, the determining can include identifying a halt record for the specific database transaction and matching a current time with the corresponding one or more processing sessions or a start time and the end time of the halt.

In step 516, the server is programmed to perform the specific database transaction in response to determining that no halt record of the one or more halt records in the internal databases is in effect for the specific database item.

In step 518, the server is programmed to transmit a result of the specific database transaction in response to the request to the client device 150.

In certain embodiments, the process 500 is performed by one or more processors.

In certain embodiments, the process 500 can include receiving a second request for a second database transaction related to a second database item from a second client device 150. In some embodiments, the process 500 can include determining whether any halt record is in effect for the second database item. In some embodiments, in response to determining that a second halt record is in effect for the second database item, notifying the second client device 150 that the second request is being halted.

In certain embodiments, after notifying the second client device 150, determining that the second halt record will expire after a certain period of time. In some embodiments, the process 500 can include notifying the second client device 150 that the second request can be processed after the certain period of time.

Additional example processes are recited as follows:

A non-transitory, computer-readable storage medium storing one or more sequences of instructions which when executed cause one or more processors to perform:

receiving source data related to a plurality of database items in internal databases from a plurality of data sources;

extracting a plurality of events from the source data, each event of the plurality of events indicating that a database item of the plurality of database items is unavailable for one or more database transactions;

creating a halt record for a halt corresponding to each event of the plurality of events to generate one or more halt records in the internal databases, the halt record including a status, a data source of the plurality of data sources from which the event was extracted, a reason for the halt based on the event, one or more processing sessions in which the halt is in effect, and an end time of the halt;

resolving conflicts among the one or more halt records to obtain an updated set of halt records;

receiving a request for a specific database transaction related to a specific database item from a client device during a processing session of a plurality of processing sessions including the one or more processing sessions;

determining whether any halt record of the one or more halt records in the internal databases is in effect for the specific database item;

performing the specific database transaction in response to determining that no halt record of the one or more halt records in the internal databases is in effect for the specific database item;

transmitting a result of the specific database transaction in response to the request to the client device.

A system for managing data availability for database transactions, comprising:

a memory;

one or more processors coupled to the memory and configured to perform:

receiving source data related to a plurality of database items in internal databases from a plurality of data sources;

extracting a plurality of events from the source data, each event of the plurality of events indicating that a database item of the plurality of database items is unavailable for one or more database transactions;

creating a halt record for a halt corresponding to each event of the plurality of events to generate one or more halt records in the internal databases, the halt record including a status, a data source of the plurality of data sources from which the event was extracted, a reason for the halt based on the event, one or more processing sessions in which the halt is in effect, and an end time of the halt;

resolving conflicts among the one or more halt records to obtain an updated set of halt records;

receiving a request for a specific database transaction related to a specific database item from a client device during a processing session of a plurality of processing sessions including the one or more processing sessions;

determining whether any halt record of the one or more halt records in the internal databases is in effect for the specific database item;

performing the specific database transaction in response to determining that no halt record of the one or more halt records in the internal databases is in effect for the specific database item;

transmitting a result of the specific database transaction in response to the request to the client device.

5. Example Implementation

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices, such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 6:
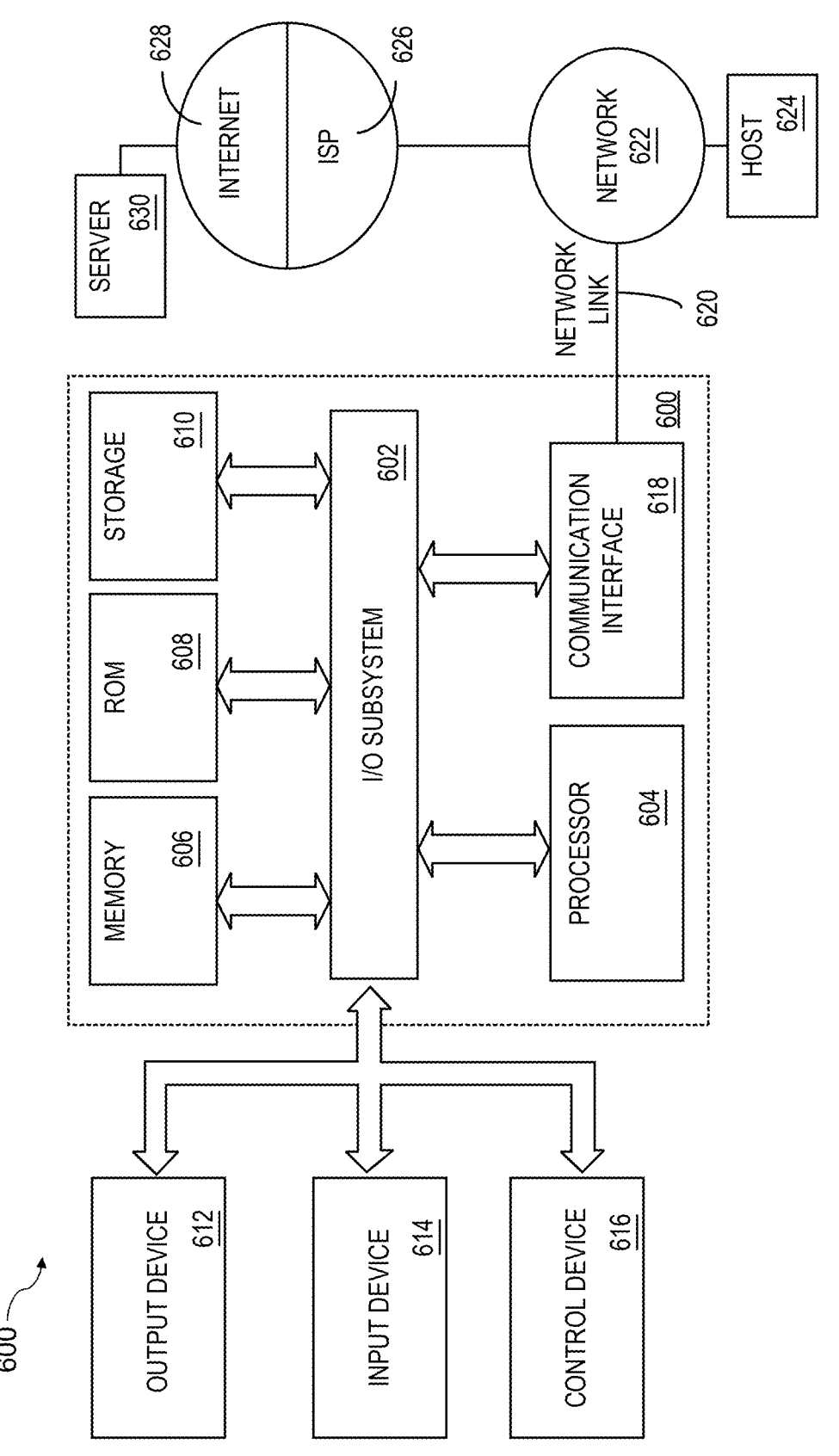
FIG. 6 illustrates an example computer system in accordance with some embodiments.

FIG. 6 is a block diagram that illustrates an example computer system 600 in accordance with some embodiments. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus and/or other communication mechanism(s) for communicating information and/or instructions between the components of the computer system 600 over electronic signal paths. The I/O subsystem 602 may include an I/O controller, a memory controller and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller and/or a special-purpose microprocessor such as an embedded system or a graphics processing unit (GPU) or a digital signal processor or advanced RISC machines (ARM) processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 604. Memory 606 may include volatile memory such as various forms of random-access memory (RAM) or other dynamic storage devices. Memory 606 also may be used for storing temporary variables or other intermediate information during execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read only memory (ROM) 608 or other static storage device coupled to I/O subsystem 602 for storing information and instructions for processor 604. The ROM 608 may include various forms of programmable ROM (PROM) such as erasable PROM (EPROM) or electrically erasable PROM (EEPROM). A unit of persistent storage 610 may include various forms of non-volatile RAM (NVRAM), such as FLASH memory, or solid-state storage, magnetic disk, or optical disk such as CD-ROM or DVD-ROM, and may be coupled to I/O subsystem 602 for storing information and instructions. Storage 610 is an example of a non-transitory computer-readable medium that may be used to store instructions and data which when executed by the processor 604 cause performing computer-implemented methods to execute the techniques herein.

The instructions in memory 606, ROM 608 or storage 610 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement Transmission Control Protocol/Internet Protocol (TCP/IP), Hypertext Transfer Protocol (HTTP) or other communication protocols; file processing instructions to interpret and render files coded using HTML, Extensible Markup Language (XML), Joint Photographic Experts Group (JPEG), Moving Picture Experts Group (MPEG) or Portable Network Graphics (PNG); user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or NoSQL, an object store, a graph database, a flat file system or other data storage.

Computer system 600 may be coupled via I/O subsystem 602 to at least one output device 612. In one embodiment, output device 612 is a digital computer display. Examples of a display that may be used in various embodiments include a touch screen display or a light-emitting diode (LED) display or a liquid crystal display (LCD) or an e-paper display. Computer system 600 may include other type(s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators, or servos.

At least one input device 614 is coupled to I/O subsystem 602 for communicating signals, data, command selections or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on the output device 612. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 614 may include a combination of multiple different input devices, such as a video camera and a depth sensor.

In another embodiment, computer system 600 may comprise an internet of things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware, and interfaces for generating position reporting packets, notifications, pulse or heartbeat signals, or other recurring data transmissions that specify a position of the computer system 600, alone or in combination with other application-specific data, directed toward host computer 624 or server 630.

Computer system 600 may implement the techniques described herein using customized hard-wired logic, at least one ASIC or FPGA, firmware and/or program instructions or logic which when loaded and used or executed in combination with the computer system 600 causes or programs the computer system 600 to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage 610. Volatile media includes dynamic memory, such as memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to be read by computer system 600. For instance, a receiver such as a radio frequency antenna or an infrared detector can receive the data carried in a wireless or optical signal and appropriate circuitry can provide the data to I/O subsystem 602, such as to place the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to I/O subsystem 602. Communication interface 618 provides a two-way data communication coupling to network link(s) 620 that are directly or indirectly connected to at least one communication network, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 622 broadly represents a LAN, WAN, campus network, internetwork, or any combination thereof. Communication interface 618 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic, or optical signals over signal paths that carry digital data streams representing various types of information.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through a network 622 to a host computer 624.

Furthermore, network link 620 may provide a connection through network 622 or to other computing devices via internetworking devices and/or computers that are operated by an Internet Service Provider (ISP) 626. ISP 626 provides data communication services through a world-wide packet data communication network represented as internet 628. A server 630 may be coupled to internet 628. Server 630 broadly represents any computer, data center, virtual machine, or virtual computing instance with or without a hypervisor, or computer executing a containerized program system such as DOCKER or KUBERNETES. Server 630 may represent an electronic digital service that is implemented using more than one computer or instance and that is accessed and used by transmitting web services requests, URL strings with parameters in HTTP payloads, application programming interface (API) calls, app services calls, or other service calls. Computer system 600 and server 630 may form elements of a distributed computing system that includes other computers, a processing cluster, server farm or other organization of computers that cooperate to perform tasks or execute applications or services. Server 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. Server 630 may comprise a web application server that hosts a presentation layer, application layer and data storage layer such as a relational database system using SQL or NoSQL, an object store, a graph database, a flat file system or other data storage.

Computer system 600 can send messages and receive data and instructions, including program code, through the network(s) 622, network link 620 and communication interface 618. In the Internet example, a server 630 might transmit a requested code for an application program through Internet 628, ISP 626, local network 622 and communication interface 618. The received code may be executed by processor 604 as it is received, and/or stored in storage 610, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor 604 to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

6. Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method of managing data availability for database transactions, comprising:
   receiving source data related to a plurality of database items in internal databases of a computing environment from a plurality of data sources;
   extracting a plurality of events from the source data, each event of the plurality of events being external to the computing environment and indicating that a database item of the plurality of database items is unavailable for one or more database transactions;

creating a halt record for a halt corresponding to each event of the plurality of events to generate one or more halt records in the internal databases,
   each halt record of the one or more halt records including a status, an identifier of a data source of the plurality of data sources from which the source data including the corresponding event was received, a reason for the halt based on the corresponding event, an indication of one or more processing sessions in which the halt is in effect, and an end time of the halt;
   resolving conflicts among the one or more halt records to obtain an updated set of halt records;
   receiving, subsequent to the creating, a request for a specific database transaction related to a specific database item from a client device during a processing session of a plurality of processing sessions including the one or more processing sessions;
   determining whether any halt record of the updated set of halt records in the internal databases is in effect for the specific database item;
   performing the specific database transaction in response to determining that no halt record of the updated set of halt records in the internal databases is in effect for the specific database item;
   transmitting a result of the specific database transaction in response to the request to the client device,
   wherein the method is performed by one or more processors.

2. The computer-implemented method of claim 1,
   wherein the conflicts among the one or more halt records include at least one of a processing session conflict, a status conflict, a reason conflict, a data source conflict, and a time conflict,
   wherein when two halt records of the one or more halt records have multiple conflicts, resolving data source conflicts and processing session conflicts take precedence over resolving status conflicts, reason conflicts, and time conflicts.

3. The computer-implemented method of claim 1, wherein resolution of conflicts is based at least in part on a hierarchy of the plurality of data sources organized by reliability according to historical data or inclusivity relative to the internal databases.

4. The computer-implemented method of claim 1, the resolving comprising, when two halt records for a common database item indicate two different processing sessions, merging the two halt records into one halt record with a new start time being an earlier start time of two processing sessions and a new end time being a later end time of the two different processing sessions, so that the halt is to be in effect continuously between the new start time and the new end time.

5. The computer-implemented method of claim 1,
   the specific database transaction requiring a read access to the database item,
   the request leading to updating account data associated with the client device.

6. The computer-implemented method of claim 1, the extracting comprising at least one of comparing the source data to a reference number, comparing the source data from different data sources, and evaluating the source data from the data source.

7. The computer-implemented method of claim 1,
   the creating comprising determining a time period that a database item from the plurality of database items is unavailable for database transactions, the time period including a start time and the end time of the halt, the method further comprising updating the end time to be different from an end time of a session of the one or more processing sessions.

8. The computer-implemented method of claim 1, the plurality of processing sessions respectively applying to non-identical periods within a day, the creating comprising identifying the one or more processing sessions based on the reason or the data source.

9. The computer-implemented method of claim 1, wherein when the reason predicts a volume of data processing activities above a certain threshold during a specific processing session of the plurality of processing sessions, the one or more processing sessions apply before the specific processing session.

10. The computer-implemented method of claim 1, wherein when the data source is a single point of failure for a specific processing session of the plurality of processing sessions, the one or more processing sessions includes the specific processing session.

11. The computer-implemented method of claim 1, further comprising publishing a special record and a special snapshot file after the resolving.

12. The computer-implemented method of claim 1, further comprising transmitting, to a queue, a message for each halt record of a set of halt records that are to be in effect during a common processing session and subsequently transmitting a confirmation message to the queue before a start time of the common processing session indicating that the set of halt records have been created.

13. The computer-implemented method of claim 12, further comprising creating an unscheduled snapshot file of the internal databases including the set of halt records in addition to scheduled snapshot files of the internal databases.

14. The computer-implemented method of claim 1, further comprising routing the request for the specific database transaction to a new version of a hosted application that is running concurrently with an old version of the hosted application during a rolling update.

15. The computer-implemented method of claim 1, the determining comprising identifying a halt record for the specific database transaction and matching a current time with the corresponding one or more processing sessions or a start time and the end time of the halt.

16. The computer-implemented method of claim 1, further comprising:

receiving a second request for a second database transaction related to a second database item from a second client device;

determining whether any halt record is in effect for the second database item;

in response to determining that a second halt record is in effect for the second database item, notifying the second client device that the second request is being halted.

17. The computer-implemented method of claim 16, further comprising:

after the notifying, determining that the second halt record will expire after a certain period of time;

notifying the second client device that the second request can be processed after the certain period of time.

18. The computer-implemented method of claim 1, further comprising updating the plurality of database items based on the plurality of events before the end time of any halt record of the one or more halt records.

19. A non-transitory, computer-readable storage medium storing one or more sequences of instructions which when executed cause one or more processors to perform:

receiving source data related to a plurality of database items in internal databases of a computing environment from a plurality of data sources;

extracting a plurality of events from the source data, each event of the plurality of events being external to the computing environment and indicating that a database item of the plurality of database items is unavailable for one or more database transactions;

creating a halt record for a halt corresponding to each event of the plurality of events to generate one or more halt records in the internal databases, each halt record of the one or more halt records including a status, an identifier of a data source of the plurality of data sources from which the source data including the corresponding event was received, a reason for the halt based on the corresponding event, an indication of one or more processing sessions in which the halt is in effect, and an end time of the halt;

resolving conflicts among the one or more halt records to obtain an updated set of halt records;

receiving, subsequent to the creating, a request for a specific database transaction related to a specific database item from a client device during a processing session of a plurality of processing sessions including the one or more processing sessions;

determining whether any halt record of the updated set of halt records in the internal databases is in effect for the specific database item;

performing the specific database transaction in response to determining that no halt record of the updated set of halt records in the internal databases is in effect for the specific database item;

transmitting a result of the specific database transaction in response to the request to the client device.

20. A system for managing data availability for database transactions, comprising:

a memory;

one or more processors coupled to the memory and configured to perform:

receiving source data related to a plurality of database items in internal databases of a computing environment from a plurality of data sources;

extracting a plurality of events from the source data, each event of the plurality of events being external to the computing environment and indicating that a database item of the plurality of database items is unavailable for one or more database transactions;

creating a halt record for a halt corresponding to each event of the plurality of events to generate one or more halt records in the internal databases, each halt record of the one or more halt records including a status, an identifier of a data source of the plurality of data sources from which the source data including the corresponding event was received, a reason for the halt based on the corresponding event, an indication of one or more processing sessions in which the halt is in effect, and an end time of the halt;

resolving conflicts among the one or more halt records to obtain an updated set of halt records;

receiving, subsequent to the creating, a request for a specific database transaction related to a specific database item from a client device during a processing session of a plurality of processing sessions including the one or more processing sessions;

determining whether any halt record of the updated set of halt records in the internal databases is in effect for the specific database item;

performing the specific database transaction in response to determining that no halt record of the updated set of halt records in the internal databases is in effect for the specific database item;

transmitting a result of the specific database transaction in response to the request to the client device.

\* \* \* \* \*